United States Patent
Nakamura et al.

(10) Patent No.: US 6,778,240 B2
(45) Date of Patent: Aug. 17, 2004

(54) ANTI-GLARE AND ANTI-REFLECTION FILM, POLARIZING PLATE, AND IMAGE DISPLAY DEVICE

(75) Inventors: Kazuhiro Nakamura, Minami-ashigara (JP); Naohiro Matsunaga, Minami-ashigara (JP); Yosuke Nishiura, Minami-ashigara (JP); Hidetoshi Watanabe, Minami-ashigara (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 215 days.

(21) Appl. No.: 09/818,711

(22) Filed: Mar. 28, 2001

(65) Prior Publication Data

US 2001/0035929 A1 Nov. 1, 2001

(30) Foreign Application Priority Data

| Mar. 28, 2000 | (JP) | 2000-089180 |
| Mar. 30, 2000 | (JP) | 2000-095893 |
| Mar. 30, 2000 | (JP) | 2000-095899 |
| Oct. 31, 2000 | (JP) | 2000-333483 |

(51) Int. Cl.$^7$ ............................................ G02F 1/1335
(52) U.S. Cl. ...................................... 349/112; 359/599
(58) Field of Search .................. 349/112; 359/599, 359/614; 428/421, 323

(56) References Cited

U.S. PATENT DOCUMENTS

| 5,759,643 | A | * | 6/1998 | Miyashita et al. | .......... | 428/1.31 |
| 5,851,674 | A | * | 12/1998 | Pellerite et al. | .......... | 428/421 |
| 6,239,852 | B1 | * | 5/2001 | Oono et al. | .......... | 349/112 |
| 6,319,594 | B1 | * | 11/2001 | Suzuki et al. | .......... | 428/208 |
| 6,340,404 | B1 | * | 1/2002 | Oka et al. | .......... | 156/230 |
| 6,383,559 | B1 | * | 5/2002 | Nakamura et al. | .......... | 427/180 |
| 6,383,620 | B1 | * | 5/2002 | Aoyama et al. | .......... | 428/212 |
| 6,398,371 | B1 | * | 6/2002 | Matsunaga et al. | .......... | 359/614 |
| 6,480,249 | B2 | * | 11/2002 | Iwata et al. | .......... | 349/112 |

FOREIGN PATENT DOCUMENTS

| JP | 7-287102 | | 10/1995 | | |
| JP | 7-333404 | | 12/1995 | | |
| JP | 09222502 | A | * | 8/1997 | ............ G02B/1/11 |
| JP | 09288201 | A | * | 11/1997 | ............ G02B/1/11 |
| JP | 10142402 | A | * | 5/1998 | ............ G02B/1/11 |
| JP | 10319211 | A | * | 12/1998 | ............ G02B/1/11 |
| JP | 11006902 | A | * | 1/1999 | ............ G02B/1/11 |
| JP | 11038202 | A | * | 2/1999 | ............ G02B/1/11 |
| JP | 11153703 | A | * | 6/1999 | ............ G02B/1/11 |
| JP | 2000009907 | A | * | 1/2000 | ............ G02B/1/11 |

OTHER PUBLICATIONS

N. Kurata, Recent Developments on Optical Films for LCDs, SID Digest 1998, pp. 43–47.*

* cited by examiner

*Primary Examiner*—Kenneth Parker
*Assistant Examiner*—David Chung
(74) *Attorney, Agent, or Firm*—Burns, Doane, Swecker & Mathis, L.L.P.

(57) ABSTRACT

An anti-glare and anti-reflection film (1) which comprises, on a transparent support (2), at least one anti-glare layer (4) including particles (6), and a low refractive index layer (5) superposed in this order, in which the film has an average mirror reflectance at a 5° incidence in the wavelength region of 450 to 650 nm being 1.2% or less. A polarizing plate and an image display device using the anti-glare and anti-reflection film.

28 Claims, 2 Drawing Sheets

ANTI-GLARE AND ANTI-REFLECTION FILM, POLARIZING PLATE, AND IMAGE DISPLAY DEVICE

FIELD OF THE INVENTION

The present invention relates to an anti-reflection film having anti-glare property, and a polarizing plate using the same. Further, the present invention relates to an image display device, such as a liquid crystal display device, using the anti-glare and anti-reflection film or the polarizing plate.

BACKGROUND OF THE INVENTION

An anti-reflection film having anti-glare property is generally disposed on the outermost surface of a display, which decreases the reflectance by using the principle of optical interference, to prevent the capture of an image or the decrease of contrast due to reflection of external light, in an image display device, such as a cathode ray tube display device (CRT), a plasma display panel (PDP), and a liquid crystal display device (LCD).

However, in the anti-reflection film provided with only a hardcoat layer and a low-refractive-index layer on a transparent support, the low-refractive-index layer must be made to have a sufficiently lowered refractive index, to lower the reflectance. In order to decrease the average reflectance of, for example, an anti-reflection film, in which use is made of triacetyl cellulose, as a support, and a UV-cured coating of dipentaerythritol hexaacrylate, as a hardcoat layer, to 1.6% or less, in a wavelength range between 450 nm and 650 nm, the refractive index of such a low-refractive-index layer must be 1.40 or less.

Examples of materials having a refractive index of 1.40 or less include inorganic materials, such as magnesium fluoride and calcium fluoride, and organic materials, such as fluorine-containing compounds having a high fluorine content. However, these fluorine-containing compounds lack in cohesive power, thereby insufficient in abrasion-resistance needed for the film layer disposed on the outermost surface of a display. It is therefore conventionally necessary to use a compound having a refractive index of 1.43 or more, to insure sufficient resistance to damage (abrasion).

JP-A-7-287102 ("JP-A" means unexamined published Japanese patent application) describes that the reflectance is reduced by making the refractive index of the hardcoat layer high. However, a hardcoat layer having such a high refractive index causes uneven color on the film, because of a large difference in refractive index between the hardcoat layer and a support, and the wavelength dependency of the reflectance is thereby largely fluctuated resultantly.

Further, JP-A-7-333404 discloses anti-glare and anti-reflection films that excel in properties of gas barrier, anti-glare, and anti-reflection. However, these films need a silicon oxide film formed by a CVD method, which is poor in productivity, as compared to a wet coating method, in which a film is formed by applying a coating solution. In addition, the anti-reflection performance of a thus-obtained anti-glare and anti-reflection film is unsatisfactory.

On the other hand, it is desired to make the pixel size as small as possible in an image display device, thereby improving the quality of display (attaining highly-fine definition of an image). Therefore, there is a need to develop an anti-glare and anti-reflection film that can effectively meet this need.

SUMMARY OF THE INVENTION

The present invention is an anti-glare and anti-reflection film that comprises a transparent support having thereon, an anti-glare layer and at least one low refractive index layer superposed in this order, wherein an average mirror (specular) reflectance at an incidence of 5 degrees in the wavelength region of 450 nm to 650 nm is 1.2% or less.

Further, the present invention is a polarizing plate that comprises a polarizing layer and two protective films therefor, at least one of said protective films being the above-mentioned anti-glare and anti-reflection film.

Furthermore, the present invention is an image display device, in which the above-mentioned anti-glare and anti-reflection film or the above-mentioned anti-glare and anti-reflection polarizing plate (i.e. its anti-reflection layer), is disposed as the outermost surface layer at the display side.

Other and further features and advantages of the invention will appear more fully from the following description, taken in connection with the accompanying drawings.

DETAILED DESCRIPTION OF THE INVENTION

Figure 1:
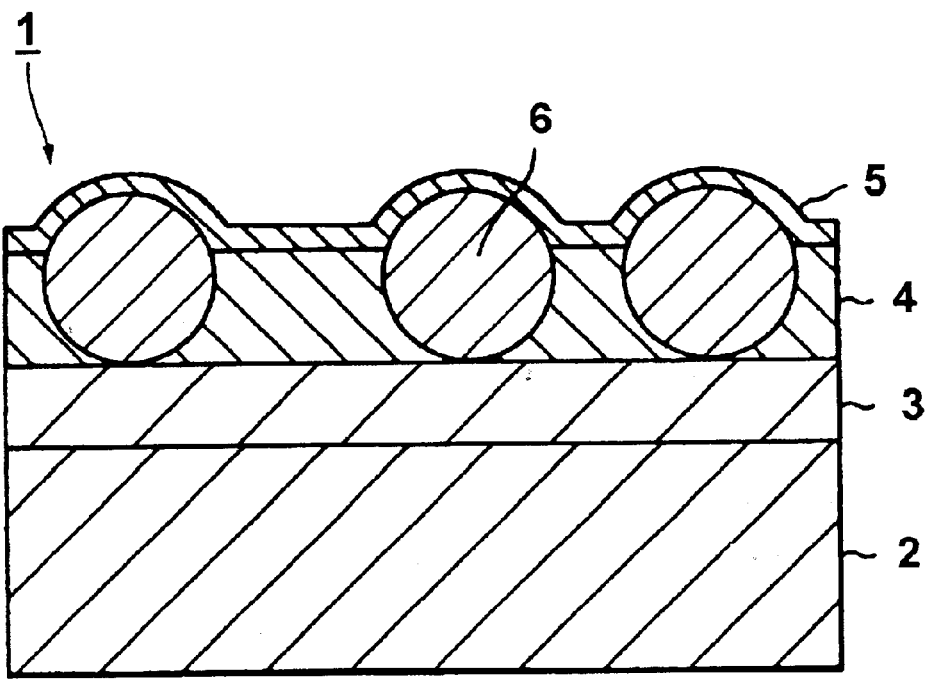
FIG. 1 is a sectional schematic view showing a preferable embodiment of layer constitution of an anti-glare and anti-reflection film.

According to the present invention, there are provided the following means:

(1) An anti-glare and anti-reflection film comprising a transparent substrate (a transparent support) having thereon an anti-glare layer and at least one low refractive index layer superposed in this order, wherein an average mirror reflectance at an incidence of 5 degrees in the wavelength region of 450 nm to 650 nm is 1.2% or less.

(2) The anti-glare and anti-reflection film according to the above (1), wherein an average integral reflectance at an incidence of 5 degrees in the wavelength region of 450 nm to 650 nm is 2.5% or less.

(3) The anti-glare and anti-reflection film according to the above (1) or (2), wherein the coloration of a light regularly reflected to a light incident at an angle of 5 degrees from a CIE standard light source $D_{65}$ in the wavelength region of 380 nm to 780 nm is a coloration in which $L^*$, $a^*$, and $b^*$ values of the CIE 1976 $L^*a^*b^*$ color space each satisfy the following formulas:

$$L^* \leq 10,\ 0 \leq a^* \leq 2,\ -5 \leq b^* \leq 2.$$

(4) The anti-glare and anti-reflection film according to any one of the above (1) to (3), wherein the overall haze of said anti-glare and anti-reflection film is from 3.0% to 20.0%

(5) The anti-glare and anti-reflection film according to any one of the above (1) to (4), wherein the overall haze value is in the range of 5 to 15%.

(6) The anti-glare and anti-reflection film according to any one of the above (1) to (5), wherein said low refractive index layer is composed of a cured product of a fluorine-containing resin of a type curable by heat or ionization radiation.

(7) The anti-glare and anti-reflection film according to the above (6), wherein a coefficient of kinetic friction of the low refractive index layer composed of said cured product of the fluorine-containing resin is in the range of 0.03 to 0.15, and further a contact angle with a water is in the range of 90° to 120°.

(8) The anti-glare and anti-reflection film according to any one of the above (1) to (7), wherein said low refractive index layer has a refractive index of 1.38 to 1.49

(9) The anti-glare and anti-reflection film according to any one of the above (1) to (8), wherein said anti-glare layer is composed of a polymer cross-linked by ionization radiation.

(10) The anti-glare and anti-reflection film according to any one of the above (1) to (9), wherein said anti-glare layer contains particles having an average particle size from 0.3 μm to 10.0 μm.

(11) The anti-glare and anti-reflection film according to any one of the above (1) to (10), wherein said particles contained in the anti-glare layer are spherical organic macromolecular particles.

(12) The anti-glare and anti-reflection film according to any one of the above (1) to (11), wherein said anti-glare layer has a refractive index in the range of 1.57 to 2.00.

(13) The anti-glare and anti-reflection film according to any one of the above (1) to (12), wherein said anti-glare layer is formed from a monomer having at least two ethylenically unsaturated groups, and an oxide of at least one metal selected from the group consisting of titanium, aluminum, indium, zinc, tin, antimony and zirconium having a particle size of 0.1 μm or less.

(14) The anti-glare and anti-reflection film according to any one of the above (1) to (13), wherein the low refractive index layer contains inorganic fine particles having an average particle size from 0.001 μm to 0.1 μm.

(15) The anti-glare and anti-reflection film according to any one of the above (1) to (14), wherein the the low refractive index layer contains silicon oxide particles as inorganic fine particles.

(16) The anti-glare and anti-reflection film according to any one of the above (1) to (15), wherein the low refractive index layer is composed of a cured product of a polymer obtainable by polymerization of a fluorine-containing vinyl monomer.

(17) The anti-glare and anti-reflection film according to any one of the above (1) to (16), wherein said anti-glare and anti-reflection film has the value of optical contact index ranging from 15% to 65% at the wavelength of 0.5 μm, under applied load conditions of 1.57 MPa.

(18) The anti-glare and anti-reflection film according to any one of the above (1) to (17), wherein said anti-glare and anti-reflection film has the value of clearness of the transmitted image ranging from 30% to 70%, said value being measured by means of an instrument for measuring image clarify, using an optical wedge of 0.5 mm in width.

(19) A polarizing plate comprising a polarizing layer and two protective films therefor, at least one of said protective films being the anti-glare and anti-reflection film according to any one of the above (1) to (18).

(20) An image display device (e.g. a liquid crystal display device) comprising a display component, wherein the anti-glare and anti-reflection film according to any one of the above (1) to (18) or an anti-reflection layer of the anti-glare and anti-reflection polarizing plate according to the above (19) is disposed as the outermost surface layer at the display side.

The fundamental constitution of the anti-glare and anti-reflection film of the present invention will be explained with reference to drawings.

The embodiment shown in FIG. 1 is one preferable embodiment of the anti-glare and anti-reflection film of the present invention. In this case, the anti-glare and anti-reflection film 1 has a layer constitution composed of a transparent support 2 composed of triacetyl cellulose, a hard coat layer 3, an anti-glare layer 4, and a low refractive index layer 5, in this stated order. Further, resin matt particles 6 are dispersed in the anti-glare layer 4.

Figure 2:
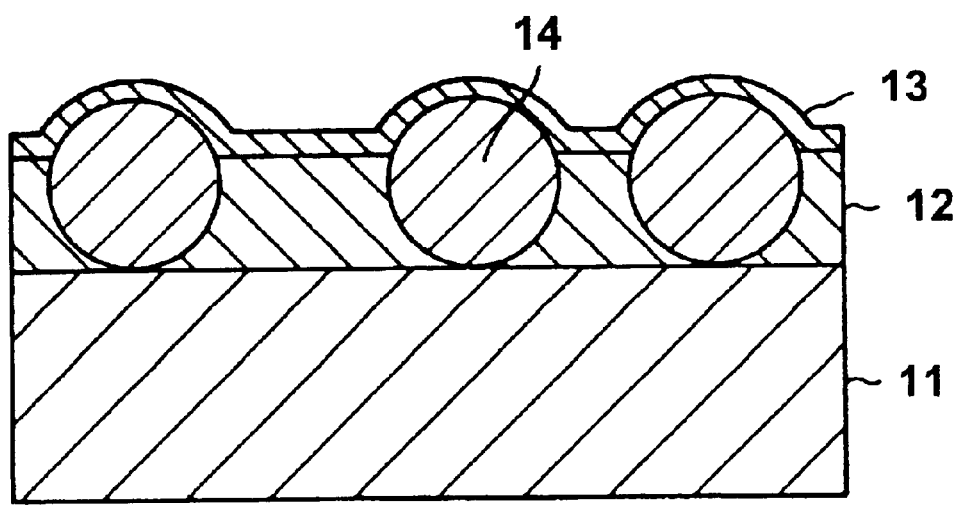
FIG. 2 is a sectional schematic view showing another preferable embodiment of layer constitution of an anti-glare and anti-reflection film.

The embodiment shown in FIG. 2 is another preferable embodiment of the anti-glare and anti-reflection film of the present invention, which has a layer constitution composed of a transparent support 11, an anti-glare layer 12 and a low refractive index layer 13, in this order. The number 14 symbols particles. A refractive index of the material for forming the part other than the particles in the anti-glare layer is preferably in the range of 1.57 to 2.00, while the refractive index of the low refractive index layer is preferably in the range of 1.38 to 1.49. As shown in FIG. 1, at least one another hard coating layer may be disposed between the anti-glare layer 12 and a transparent support 11. The above-mentioned another hard coating layer generally may or may not contain particles.

With regard to the anti-glare and anti-reflection film of the present invention, the average mirror reflectance at an incidence of 5 degrees in the wavelength region of 450 nm to 650 nm is generally 1.2% or less, and preferably 1.1% or less.

Further, the average integral reflectance at an incidence of 5 degrees in the wavelength region of 450 nm to 650 nm is preferably 2.5% or less, more preferably 2.3% or less.

The mirror reflectance at an incidence of 5 degrees and the integral reflectance at an incidence of 5 degrees will be explained below.

The mirror reflectance at an incidence of 5 degrees is a ratio of intensity of light reflected at the angle of {a normal direction of the sample−5 degrees} to intensity of light incident from the angle of {normal direction+5 degrees}, and it is used as a measure of the capture of an image of a surrounding scene due to a mirror reflection. In the case where the mirror reflectance is applied to the anti-glare and anti-reflection film, the intensity of a light reflected at the angle of {the normal direction−5 degrees} becomes more week in proportion to a light scattered owing to roughness (unevenness) of the surface which is provided to give an anti-glare performance to the film. Accordingly, it can be said that the mirror reflectance is a measuring method which reflects contribution of both performances of anti-glare and anti-reflection.

On the other hand, integral reflectance at an incidence of 5 degrees is a ratio of the integral value of intensities of lights reflected to all directions to intensity of light incident from the angle of {the normal direction to the sample+5 degrees}. In the case where the integral reflectance is applied to the anti-glare and anti-reflection film, it is possible to measure so as to reflect only anti-reflection performance, because reduction of the reflected light owing to an anti-glare performance does not occur.

Accordingly, it is possible to satisfy both performances of anti-glare and anti-reflection at the same time by each adjusting the above-mentioned average reflectances to 1.2% or less (mirror reflectance) and 2.5% or less (integral reflectance), respectively, in the wavelength region 450 nm to 650 nm.

If the average mirror reflectance at an incidence of 5 degrees in the wavelength region of 450 nm to 650 nm of the anti-glare and anti-reflection film exceeds 1.2%, reflection of a surrounding scene (capture of an image of the surrounding scene) is recognized, and a visual perception performance reduces when the anti-glare and anti-reflection film is used as a surface film for the display device.

On the other hand, if the average integral reflectance at an incidence of 5 degrees in the wavelength region of 450 nm to 650 nm of the anti-glare and anti-reflection film becomes too large, an advantage on that a contrast of the display device is improved, reduces, and a display screen is whitened by a light scattered owing to roughness (unevenness) of the surface which is provided to give an anti-glare performance to the film. As a result, a display quality of the display device is deteriorated.

The anti-glare and anti-reflection film of the present invention is preferably designed so that, when the coloration (color balance) of a light regularly reflected to a light incident at an angle of 5 degrees from a CIE standard light source $D_{65}$ is quntitatively determinated by the values of $L^*$, $a^*$, and $b^*$ of the CIE 1976 $L^*a^*b^*$ color space, these values each satisfy the following numerical formula:

$$L^*\leq 10, 0\leq a^*\leq 2, -5\leq b^*\leq 2.$$

The coloration of a regularly reflected light which satisfies these relationships is a neutral coloration.

The coloration of a light regularly reflected to a light incident at an angle of 5 degrees from a CIE standard light source $D_{65}$ can be quntitatively determinated by each calculating the values of $L^*$, $a^*$, and $b^*$ of the CIE 1976 $L^*a^*b^*$ color space, from a spectral reflection spectrum obtained by calculating a product of the observed values of mirror reflectance at an incidence of 5 degrees in the wavelength region of 380 nm to 780 nm and the spectral distribution of the light source $D_{65}$ at respective wavelength.

If the $L^*$ value becomes too large, anti-reflection performance is unsatisfactory. If the $a^*$ value becomes too large, a purplish red of the reflected light becomes strong, and in contrast if the $a^*$ value becomes too small, a green of the reflected light becomes strong, both of which are not preferred. Further, if the $b^*$ value is too small, a blue tint becomes strong and if the $b^*$ value becomes too large, a yellow becomes strong, both of which are not preferred.

An anti-glare and anti-reflection film which provides a reflected light having the above-mentioned neutral coloration, and in addition which has a low refractive index, can be obtained by optimizing a balance between a refractive index of the low refractive index layer and a refractive index of a binder material of the anti-glare layer.

Generally, with regard to a conventional anti-reflection film comprising at least three optically thin films which are formed by a method such as vapor deposition and spattering, the average mirror reflectance can be reduced to 0.3% or less, and accordingly the $L^*$ value can also be reduced to 3 or less, while the $a^*$ value becomes 10 or more and the $b^*$ value is less than $-10$. As a result, a change (increase) in coloration of the reflected light becomes quite remarkable. In contrast, the anti-glare and anti-reflection film of the present invention is sharply improved in the point of the above-mentioned coloration of the reflected light.

The anti-glare and anti-reflection film of the present invention has a overall haze value preferably in the range of 3 to 20%, more preferably in the range of 5 to 15%, further preferably in the range of 7 to 13%. Although the anti-glare performance and the haze value do not always correspond linearly, if the haze value becomes too small, it is difficult to obtain an anti-glare film providing a sufficient anti-glare performance. On the other hand, if the haze value becomes too large, scattering on the surface and inside becomes too strong. As a result, problems, such as whitening, and lowering of clearness of the image, undesirably arise.

Each of layers, which constitute the inventive anti-glare and anti-reflection film having the above-mentioned characteristics, is explained below.

The anti-glare and anti-reflection film of the present invention has, on a transparent support, an anti-glare layer, and further at least one low refractive index layer superposed thereon, and as occasion demands, a flat hard coating layer may be disposed under the anti-glare layer.

As the transparent support of the anti-glare and anti-reflection film of the present invention, plastic films are preferably used. Examples of polymers which form a plastic film include cellulose esters (e.g., triacetyl cellulose, diacetyl cellulose), polyamides, polycarbonates, polyesters (e.g., polyethylene terephthalate, polyethylene naphthalate), polystyrenes, and polyolefins (e.g., ARTON (trade name, made by JSR Co., Ltd., material name: norbornene-series polyolefin), ZEONEX (trade name, made by Nippon Zeon Co., Ltd., material name: norbornene-series polyolefin)). Among these polymers, preferred are triacetyl cellulose, polyethylene terephthalate, polyethylene naphthalate, ARTON, and ZEONEX. Triacetyl cellulose is particularly preferred. The refractive index of triacetyl cellulose is 1.48.

As the transparent support for the anti-glare and anti-reflection film of the present invention, it is preferable to use a triacetyl cellulose film produced by casting a triacetyl cellulose dope, which is prepared by dissolving triacetyl cellulose in a solvent, using any one of casting methods, such as monolayer casting, multilayer co-casting and multilayer sequential casting. A triacetyl cellulose film, which is produced using a triacetyl cellulose dope prepared by dissolving triacetyl cellulose in a solvent that does not substantially contain dichloromethane by a cooling dissolution method or a high-temperature dissolution method, is preferable in view of, particularly, environmental safeguard.

Examples of the monolayer casting for triacetyl cellulose include drum casting and band casting, as disclosed in JP-A-7-11055, and the latter co-casting for triacetyl cellulose composed of plural layers is disclosed, for example, in JP-A-61-94725 and JP-B-62-43846 ("JP-B" means examined Japanese patent publication). The sequential casting is carried out by repeating the monolayer casting. Each casting is a method involving the following steps. Specifically, a raw material flake is dissolved in a solvent, such as halogenated hydrocarbons (e.g., dichloromethane), alcohols (e.g., methanol, ethanol and butanol), esters (e.g., methyl formate and methyl acetate) and ethers (e.g., dioxane, dioxolan and diethyl ether), to which are then added various additives, such as a plasticizer, ultraviolet absorber, anti-deterioration agent, lubricant and releasing promoter, according to the need, to form a solution (that is called as a dope). The dope is cast on a support constituted of a horizontal type endless metal belt or a rotating drum, by a dope supply means (called a die). At this time, a single dope is supplied by monolayer casting in the case of a single layer, whereas a low-concentration dope is co-cast on both sides of a high-concentration cellulose ester dope in the case of plural layers, and the dope is dried on the support to some extent to form a film to which rigidity is imparted. The film is then peeled from the support and allowed to pass through a drying section by various carrier means, to remove the solvent.

Typical examples of the solvent used to dissolve triacetyl cellulose include dichloromethane. A halogenated hydrocarbon such as dichloromethane can be used technologically without any problem. However, if a triacetyl cellulose dope prepared by dissolving triacetyl cellulose in a solvent which substantially contains dichloromethane is used for manufacturing a film by the monolayer casting method, dichloromethane is emitted in an atmosphere in the production step. It is preferable not to substantially contain a halogenated hydrocarbon such as dichloromethane, in view of environmental safeguard and working circumstance. The term "not substantially contain" means that the proportion of the halogenated hydrocarbon in the organic solvent is less than 5 mass % (preferably less than 2 mass %). In the case of co-casting method, even if a dope using a solvent which substantially contains dichloromethane is cast by the multilayer co-casting method, a dope having a higher triacetyl cellulose concentration than the outside cast layer can be used for the inside cast layer, with the result that the amount of dichloromethane emitted in an atmosphere can be decreased. Also, the rate of casting can be increased and also the productivity is improved. It is needless to say that even in the case of the co-casting method, it is preferable that a halogenated hydrocarbon such as dichloromethane is not contained substantially.

When the dope of triacetyl cellulose is prepared by using a solvent which does not substantially contain halogenated hydrocarbon such as dichloromethane and the like, a specific dissolution method as will be described later is essential.

A first dissolution method is called the cooling dissolution method, which will be explained below. First, triacetyl cellulose is gradually added to the solvent with stirring at a temperature (−10 to 40° C.) close to ambient temperature. Then, the mixture is cooled to −100 to −10° C. (preferably −80 to −10° C., more preferably −50 to −20° C. and most preferably −50 to −30° C.). The cooling can be carried out, for example, in a dry ice/methanol bath (−75° C.) or in a cooled diethylene glycol solution (−30 to −20° C.). If the mixture is cooled in this manner, the mixture of the triacetyl cellulose and the solvent is solidified. Further, the cooled mixture is heated to 0 to 200° C. (preferably 0 to 150° C., more preferably 0 to 120° C. and most preferably 0 to 50° C.), thereby forming a solution in which the triacetyl cellulose is fluidized in the solvent. As to the heating, the mixture may be allowed to stand at ambient temperature or heated in a hot bath.

A second dissolution method is called the high-temperature dissolution method, which will be explained below. First, triacetyl cellulose is gradually added to the solvent with stirring at a temperature (−10 to 40° C.) close to ambient temperature. For the triacetyl cellulose solution according to the present invention, it is preferable that triacetyl cellulose is added to a mixed solvent containing various solvents to swell it in advance. In the present method, the concentration of triacetyl cellulose to be dissolved is preferably 30 mass % or less; however, it is preferably as high as possible in view of drying efficiency when the film is formed. Then, the mixed solution of organic solvent is heated to 70 to 240° C. (preferably 80 to 220° C., more preferably 100 to 200° C. and most preferably 100 to 190° C.) under a pressure of 0.2 MPa to 30 MPa. Then, it is necessary to cool the heated solution to the lowest boiling point of the solvents to be used or lower than the temperature in general, because the heated solution cannot be applied as it is. In this case, the heated solution is cooled to −10 to 50° C. and returned to normal pressure in general. The cooling may be carried out by only allowing a high-pressure and high-temperature resistant container or line containing the triacetyl cellulose solution to stand at ambient temperature, or more preferably by cooling the equipment by using a cooling medium such as cooling water.

As the protective film which protects a polarizing layer of the polarizing plate for use in the image display device such as a liquid display device, triacetyl cellulose is generally used. Therefore, if a transparent support of the anti-glare and anti-reflection film is a triacetyl cellulose film, the anti-glare and anti-reflection film can be preferably used entirely as a protective film. In this embodiment, an anti-glare and anti-reflection film can be disposed as a protective film at the outermost surface of the display (screen) side of the image display device such as a liquid display device, by means of, for example, providing an adhesive layer on one side of the anti-glare and anti-reflection film.

With regard to the anti-glare layer, it is preferable that matt particles having a particle size of generally 0.3 to 10 μm, and preferably 1 to 10 μm, as well as fine particles of a metal oxide having a particle size of 100 nm or less are dispersed in a binder polymer.

The refractive index of an anti-glare layer-forming component, except for the matt particles, i.e., a binder polymer or a dispersion of fine particles of a metal oxide having a particle size of 100 nm or less dispersed in the binder polymer, is a high refractive index preferably in the range of 1.57 to 2.00, more preferably in the range of 1.60 to 1.80. If the value of refractive index is too small, an anti-reflection performance is low. On the other hand, if the value is too large, a change (increase) in coloration sometimes becomes too large.

The refractive index of the anti-glare layer (or hard coat layer) containing particles in the present invention is not expressed by one value, but the layer is a layer having ununiform refractive indexes in which particles are dispersed in materials forming the anti-glare layer. When the high-refractive-index material is composed of a monomer having two or more ethylenically unsaturated groups and fine particles having a particle diameter of 100 nm or less composed of at least one oxide of a metal selected from titanium, aluminum, indium, zinc, tin, antimony and zirconium, no light scattering is caused because the particle diameter of the fine particle is sufficiently smaller than the wavelength of light. Hence the high-refractive-index material behaves as an optically uniform material. This fact is described in JP-A-8-110401.

Such an anti-glare layer has no influence on the optical interference therein, on account that the internal scattering of light is caused by the matt particles having, for example, a particle size of 1 to 10 μm, which are dispersed in a high refractive index binder polymer. In contrast, in the high refractive index anti-glare layer which is free of matt particles having the above-mentioned particle size, a great amplitude of the reflectance owing to a dependence of the reflectance on the wavelength is seen, on account of the optical interference due to a difference in refractive index between the anti-glare layer and a support. As a result, anti-reflection effect is deteriorated and at the same time uneven color occurs.

As the compound (a binder polymer) used in the anti-glare layer or the hard coat layer, a polymer having a saturated hydrocarbon chain or a polyether chain, as a main chain, is preferred. Among them, a polymer having a saturated hydrocarbon chain as a main chain is more preferred.

Further, it is preferred that the binder polymer has a cross-linking structure.

As the binder polymer having a saturated hydrocarbon chain as a main chain, polymers of ethylenically unsaturated monomers are preferred. As the binder polymer having a saturated hydrocarbon chain as a main chain and in addition a cross-linking structure, (co)polymers of monomers having at least two ethylenically unsaturated groups are preferred.

In order to produce a polymer having a high refractive index, it is preferred to incorporate an aromatic ring, or at least one atom selected from a group consisting of halogen (except for fluorine), sulfur, phosphorus and nitrogen atoms, into the structure of the foregoing monomer.

Examples of the monomer having two or more ethylenically unsaturated groups include esters of a polyhydric alcohol and a (meth)acrylic acid (e.g., ethyleneglycol di(meth)acrylate, 1,4-cyclohexane diacrylate, pentaerythrytol tetra(meth)acrylate, pentaerythritol tri(meth)acrylate, trimethylolpropane tri(meth)acrylate, trimethylolethane tri (meth)acrylate, dipentaerythriytol tetra(meth)acrylate, dipentaerythriytol penta(meth)acrylate, dipentaerythriytol hexa(meth)acrylate, 1,2,3-cyclohexane tetramethacrylate, polyurethane polyacrylate, polyester polyacrylate), vinyl benzene and its derivatives (e.g., 1,4-divinylbenzene, 4-vinylbenzoic acid-2-acryloylethylester, 1,4-divinylcyclohexanone), vinylsulfones (e.g., divinylsulfone), acrylamides (e.g., methylene-bis-acrylamide) and methacrylamides.

Specific examples of the high-refractive-index monomer include bis(4-methacryloylthiophenyl)sulfide, vinylnaphthalene, vinylphenylsulfide and 4-methacryloxyphenyl-4'-methoxyphenyl thioether.

Polymerization of these monomers having ethylenically unsaturated groups can be conducted by irradiation of ionization radiation or heat, in the presence of a photo radical initiator or a thermal radical initiator.

Accordingly, an anti-glare layer can be formed by the steps of: preparing a coating solution containing a monomer having ethylenically unsaturated groups, fine particles, and a photo radical initiator or a thermal radical initiator, and coating said coating solution on a transparent support, and then curing the same by a polymerization reaction owing to ionization radiation or heat.

As the binder polymer having a polyether group as a main chain, a ring-opening polymerization product of the multi-functional epoxy compound is preferred. A ring-opening polymerization can be carried out by irradiation of ionization radiation or heat, in the presence of a light-induced acid-generating agent, or a heat-induced acid-generating agent.

Accordingly, an anti-glare layer can be formed by the steps of: preparing a coating solution containing a multi-functional epoxy compound, fine particles, and a light-induced acid-generating agent or a heat-induced acid-generating agent, and coating said coating solution on a transparent support, and then curing the same by a polymerization reaction owing to ionization radiation or heat.

The cross-linking structure may be formed in a binder polymer by a method, in which a cross-linkable functional group is introduced into a polymer by the use of a monomer having a cross-linkable functional group in place of, or in addition to, the monomers having at least two ethylenically unsaturated groups, and then the introduced cross-linkable functional group is reacted to form a cross-linked structure.

Examples of the cross-linkable functional group include an isocyanate group, epoxy group, aziridine group, oxazoline group, aldehyde group, carbonyl group, hydrazine group, carboxyl group, methylol group, and active methylene group. Vinylsulfonic acid, acid anhydrides, cyanoacrylate derivatives, melamine, etherified methylols, esters and urethane, metal alkoxides such as tetramethoxysilan can also be used as a monomer to introduce the cross-linked structure. The functional groups, which exhibit cross-linking properties as a result of decomposition reaction, such as a blocked isocyanate group, may also be used. As mentioned above, the cross-linkable functional group is not limited to the foregoing functional groups but may be a functional group which shows reactivity as a result of decomposition of the functional group.

These binder polymers having a cross-linkable functional group are coated and then heated or the like, thereby forming a cross-linked structure.

In the anti-glare layer, particles, such as inorganic compound particles and resin particles, having an average particle size of generally 1 to 10 $\mu$m, preferably 1.5 to 5 $\mu$m, are generally contained as matt particles, for the purpose of giving anti-glare performance, preventing the deterioration of reflectance due to interference in a hard coating layer disposed under the anti-glare layer, and in addition preventing an uneven color. Alternatively, depending on the conditions to be practiced, the average size of the matt particles is preferably in the range of 0.3 $\mu$m to 10.0 $\mu$m, more preferably in the range of 0.5 $\mu$m to 5.0 $\mu$m, and further preferably in the range of 1.0 $\mu$m to 3.0 $\mu$m.

Preferable examples of the foregoing particles include particles of inorganic compounds such as silicon oxide (silica), $TiO_2$, and $Al_2O_3$, and resin particles such as cross-linking acrylic particles, cross-linking styrene particles, melamine resin particles, benzoguanamine resin particles, and cross-linking siloxane particles. Among them, the above-mentioned resin particles (organic polymer particles) are more preferred from the viewpoints of, for example, an excellent dispersion stability (owing to a good affinity for a binder) and an excellent sedimentation stability (owing to a low specific gravity) of particles in a coating solution for the anti-glare layer at the time of production thereof.

The shape of the particles to be used may be genuinely spherical, or irregular. A spherical shape is preferred to attain a stable anti-glare performance.

Further, two or more different kinds of particles may be used in combination.

Further, it is preferable that matt particles having a smaller particle size than the thickness of the anti-glare layer accounts for less than 50% of the total matt particles. The particle size distribution can be measured by a Coulter counter method, a centrifugal sedimentation method or the like, and the distribution is converted to a particle number distribution. Further, it is also preferable for the anti-glare layer to contain particles having a particle size more than one third time the thickness of the layer in the form of a film.

The above-mentioned particles are contained in the anti-glare layer so that the content of the particles in the formed anti-glare layer amounts to the range of preferably from 10 to 1000 $mg/m^2$, more preferably from 30 to 100 $mg/m^2$.

In the present invention, in order to increase a refractive index of the anti-glare layer or the hardcoat layer, it is preferable that the layer contains, in addition to the above-mentioned matt particles, inorganic fine particles which is composed of an oxide of at least one kind of metal selected from a group consisting of titanium, zirconium, aluminum, indium, zinc, tin and antimony, and has a particle size of generally 100 nm or less, preferably 50 nm or less.

Specific examples of the inorganic fine particles include fine particles of $TiO_2$, $ZrO_2$, $Al_2O_3$, $In_2O_3$, $ZnO$, $SnO_2$, $Sb_2O_3$, and ITO (indium titanium oxide).

The amount of these inorganic fine particles to be added is preferably in the range of 10 to 90 wt %, more preferably in the range of 20 to 80 wt %, and particularly preferably in the range of 30 to 60 wt %, based on the total weight of the anti-glare layer.

These fine particles do not increase the haze, because the particle size is sufficiently smaller than the wavelength of light. Consequently a dispersion of said fine particles dispersed in a binder polymer behaves as an optically uniform material.

As mentioned above, the refractive index of the anti-glare layer-forming component, except for the matt particles dispersed therein, i.e., a binder polymer or a dispersion of the fine particles of metal oxide having a particle size of 100 nm or less dispersed in the binder polymer, is preferably in the range of 1.57 to 2.00, more preferably in the range of 1.60 to 1.80. In order to adjust the refractive index to the above-described range, the kind and amount or proportion of the binder polymer and fine particles of the metal oxide are properly selected. The way how these factors be selected, can be easily determined by an experiment in advance.

The thickness of the anti-glare layer is preferably in the range of 0.5 to 10 $\mu$m, more preferably in the range of 1 to 5 $\mu$m.

With regard to the anti-glare and anti-reflection film of the present invention, a flat hard coating layer may be provided between a transparent support and an anti-glare layer, for the purpose of increasing a mechanical strength of the film, as occasion demands.

The thickness of the flat hard coating layer in the form of a film is preferably in the range of 1 to 10 $\mu$m, more preferably in the range of 1.2 to 6 $\mu$m. Alternatively, depending on the conditions to be practiced, the thickness of the hard coat layer in the form of a film is preferably in the range of 2 $\mu$m to 10 $\mu$m, more preferably in the range of 3 $\mu$m to 6 $\mu$m.

The components for use in the flat hard coating layer are the same as those of the anti-glare layer, except that no matt particles are used.

The refractive index of the low refractive index layer for use in the anti-glare and anti-reflection film of the present invention is preferably in the range of 1.38 to 1.49, more preferably in the range of 1.38 to 1.45, as mentioned above. Adjustment of the refractive index to the above-described range enables to reconcile a sufficient anti-reflection performance and scratch resistance, thereby providing preferable results.

Further, it is preferable, from a viewpoint of the anti-reflection performance, that the low refractive index layer satisfies the formula (I) as described below:

$$m\lambda/4 \times 0.7 < n_1 d_1 < m\lambda/4 \times 1.3 \quad (I)$$

wherein m is a positive odd number (generally 1), $n_1$ is the refractive index of the low-refractive-index layer, $d_1$ is the thickness (nm) of the low-refractive-index layer, and $\lambda$ is a wavelength of the light in the range of 500 to 550 nm.

The phrase "the low refractive index layer satisfies the formula (I)" herein used means that m (a positive odd number, generally 1) which satisfies the formula (I) in the above-described wavelength region, exists.

Preferably the low refractive index layer is composed of a cured product of a fluorine-containing resin (fluorine-containing polymer compound) of the type which is curable by heat or ionization radiation.

With regard to the cured product of the foregoing fluorine-containing resin, it is preferable that a kinetic friction coefficient is in the range of 0.03 to 0.15 and a contact angle to water is in the range of 90 to 120 degrees.

Preferable examples of the fluorine-containing resin before curing include a fluorine-containing co-polymers formed with a monomer for giving a cross-linkable functional group and a fluorine-containing monomer such as a fluorine-containing vinyl monomer, in addition to a silane compound containing a perfluoroalkyl group (e.g., (heptadecafluoro-1,1,2,2-tetradecyl)triethoxysilane).

A fluorine-containing copolymer having a heat cross-linkable functional group is classified as a heat-curable type, and a fluorine-containing copolymer having an ionization radiation cross-linkable functional group is classified as an ionization radiation-curable type.

Specific examples of the fluorine-containing (vinyl) monomer unit include, for example, fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (trade name), manufactured by Osaka Organic Chemical Industry, Ltd., and M-2020 (trade name), manufactured by Daikin Industries, Ltd.), and completely or partially fluorinated vinyl ethers, or the like.

Given as examples of the monomer for giving a cross-linkable group include, besides (meth)acrylate monomers having a crosslinkable functional group in advance in its molecule (such as glycidyl methacrylate), (meth)acrylate monomers having a carboxyl group, hydroxyl group, amino group or sulfonic acid group (e.g., (meth)acrylic acid, methylol (meth)acrylate, hydroxyalkyl (meth)acrylate and allyl acrylate). It is known in JP-A-10-25388 and JP-A-10-147739 that the latter can introduce a crosslinked structure after it is copolymerized.

Further, fluorine-containing copolymers formed of the foregoing monomer used in combination with other monomers excluding both the fluorine-containing vinyl monomer and a monomer for giving a cross-linking functional group (e.g., a monomer that does not contain a fluorine atom) may be used, as a fluorine-containing resin before curing (hardening).

There is no particular limitation to the monomer unit, which may be used in combination, and the examples thereof include olefins (for example, ethylene, propylene, isoprene, vinyl chloride, and vinylidene chloride), acrylic acid esters (for example, methyl acrylate, ethyl acrylate, 2-ethylhexyl acrylate), methacrylic acid esters (for example, methyl methacrylate, ethyl methacrylate, butyl methacrylate, and ethyleneglycol dimethacrylate), styrene and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-tert-butylacrylamide, N-cyclohexylacrylamide), methacrylamides, and acrylonitrile derivatives.

As the proportion of each of the foregoing monomers which is used to form a fluorine-containing copolymer before curing, the fluorine-containing vinyl monomer is preferably in the range of 20 to 80% by weight, the monomer for giving a cross-linking functional group is preferably in the range of 1 to 30% by weight, and the other monomers used in combination with them is preferably in the range of 0 to 70% by weight.

Inorganic fine particles may be added to the low refractive index layer for use in the anti-glare and anti-reflection film of the present invention. The addition of these fine particles provides such advantages that the volume shrinkage at the time of curing is reduced, adherence property is improved, and reduction in the scratch resistance is prevented. Further, the hardness of said inorganic fine particles improves both mechanical strength and scratch resistance of the film.

As the inorganic fine particle that can be used in the low-refractive-index layer, amorphous materials are preferably used. Those composed of an oxide, nitride, sulfide or halide of a metal are preferred, with metal oxides being particularly preferable.

As the metal atom, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are preferable, and Mg, Ca, B and Si are more preferable. Inorganic fine particles containing two types of metal may be used. A particularly preferable inorganic fine particles are silicon dioxide particles, namely silica fine particles.

The average particle diameter of the inorganic fine particles is preferably 0.001 to 0.2 $\mu$m, and more preferably 0.005 to 0.05 $\mu$m. Preferably the particle diameter of each fine particle is as uniform (monodispersion) as possible. If a particle size of said inorganic fine particles is too large, a film becomes opaque, and on the other hand, if too small, fine particles are apt to aggregate, so that synthesis and handling of them become difficult.

A blending amount (ratio) of the inorganic fine particles is preferably in the range of 3 to 90% by weight, more preferably in the range of 5 to 70% by weight, further preferably in the range of 7 to 50% by weight, still further preferably in the range of 10 to 50% by weight, and especially preferably in the range of 20 to 50% by weight, based on the total weight of the low refractive index layer. If the amount of the inorganic fine particles to be added is too much, a continuous layer of the fluorine-containing copolymer component which is a binder, can not be formed to thereby become fragile, and on the other hand if too small, the above-mentioned advantages owing to the addition of these fine particles are not effected.

Preferably the inorganic fine particles are subjected to surface treatment before use. Examples of the surface treatment include physical surface treatments, such as plasma discharge treatment and corona discharge treatment, and chemical surface treatments using a coupling agent. The use of a coupling agent is preferred. As the coupling agent, an alkoxy metal compound (e.g., a titanium coupling agent and silane coupling agent) are preferably used. When the inorganic fine particle is made of silicon oxide, treatment with a silane coupling agent is particularly effective.

After a coating solution is coated and dried, the resultant coating layer is cured by heat or irradiation of ionization radiation (e.g. ultraviolet rays, electron rays), to form a low refractive index layer.

A thickness of the low refractive index layer for use in the anti-glare and anti-reflection film is preferably in the range of 0.05 to 0.2 $\mu$m, more preferably in the range of 0.08 to 0.12 $\mu$m.

To adjust the refractive index of the low refractive index layer to the above-described specific range and in addition, to satisfy the foregoing formula (I) is carried out by adjusting a concentration of the solid content in the coating solution and a wet-coating amount.

In the above, each of layers which constitute the anti-glare and anti-reflection film of the present invention is explained.

As already mentioned, in the anti-glare and anti-reflection film of the present invention:

(a) an average mirror reflectance at an incidence of 5 degrees in the wavelength region of 450 nm to 650 nm is 1.2% or less, (b) preferably, an average integral reflectance at an incidence of 5 degrees in the wavelength region of 450 nm to 650 nm is 2.5% or less, (c) preferably, the coloration of a light regularly reflected to a light incident at an angle of 5 degrees from a CIE standard light source $D_{65}$ in the wavelength region of 380 nm to 780 nm is a coloration in which L*, a* and b* of the CIE 1976 L*a*b* color space each satisfy the following formulae:

$$L^* \leq 10, 0 \leq a^* \leq 2, -5 \leq b^* \leq 2, \text{ and}$$

(d) preferably, a haze value is in the range of 5 to 15%.

Figure 3:
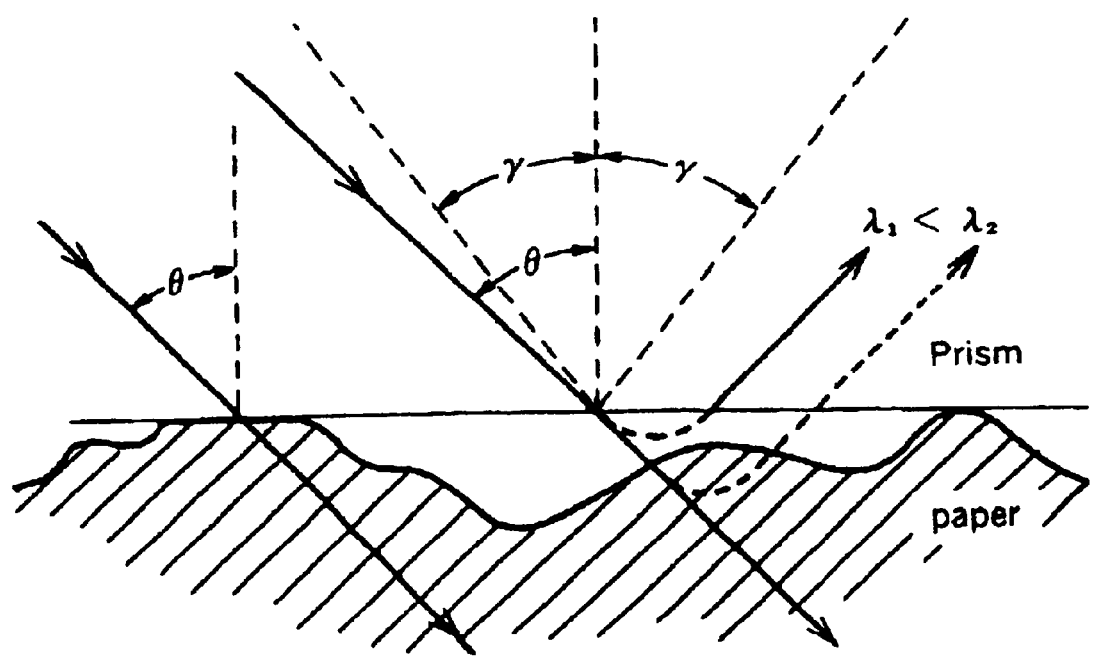
FIG. 3 is an explanatory diagram illustrating the measuring principle of the optical contact index.

The optical contact index will be explained below. This value is measured by means of the instrument, namely the microtopograph manufactured by TOYO SEIKI SEISAKU-SHO, LTD. This instrument is characterized in that a measuring area of a sample is 4.44 cm², and a pressure can be applied to the sample in the loading range of 0.98 to 4.41 MPa, and further a surface characteristics (roughness) can be measured optically, while a desired loading is applied to the sample. At this time, we adopted the loading condition of 1.57 MPa. However, the loading condition is not limited thereto. The measuring principle is as follows:

As shown in the figure below, we discuss on the supposition that the surface of a sample is adhered by pressure onto a surface of a prism, and parallel rays are irradiated at an angle θ larger than a critical angle γ of the total reflection and further reflected rays are received at the angle of diametrical reflection. The light causes a total (entire) reflection at the boarder face between media having a different refractive index with each other, if the angle of irradiation is over the critical angle. At that time, light waves reflect after passing through the border face to some extent, and the degree of "passing through" is in proportion to the wavelength of the light. Accordingly, as shown in FIG. 3, if the light having a sufficiently long wavelength passes through the border face and then reaches the surface of a sample before reflection, the transmission of light occurs as a mattr of cause. On the other hand, the light having a shorter wavelength does not reach the above-said surface of a sample, and the passed light causes a total reflection and transmits to a light-receiving device an information that "the surface of a sample did not exist at the depth corresponding to the wavelength of the instant light". Such a phenomenon that the prism and the surface of a sample do not actually contact with each other, but if the size of voids between them is an infinitesimal distance at not much more than wavelength of a light, resultantly the light penetrates into the sample, is referred to as "Frustrated Total Reflection". In this situation, they are deemed to optically contact with each other. The optical contact index is measured using the above-mentioned phenomenon, while changing a wavelength of the light to be irradiated, and thereby the ratio (percentage) of a surface area of a sample existing at a certain depth from the surface of prism according to a respective wave length, to the total surface area of the sample, can be obtained. At this time, we define the above-mentioned ratio by the value of optical contact index obtained at the wavelength of 0.5 μm. However, the applied wavelength is not limited thereto. With regard to an anti-glare and anti-reflection film which is able to cope with a high precision monitor, the optical contact index obtained at the wavelength of 0.5 μm under applied load conditions of 1.57 MPa, is preferably from 15% to 65%, more preferably from 20% to 45%.

The adjustment of the optical contact index can be carried out by controlling "a thickness of an anti-glare layer", "a size of matt particles", "a frequency of the matt particles (a coating amount, contents)", "a degree of dispersion of particles", "the affinity of the particles for a binder", and the like.

Further, with regard to a combination of the haze and the value of optical contact index, it is preferred that the haze is from 5% to 18% and the value of optical contact index is from 15% to 65%, and it is more preferred that the haze is from 8% to 15% and the value of optical contact index is from 20% to 45%.

The value of clearness of the transmitted image will be explained below. The value is measured by means of the apparatus, namely an instrument for measuring image clarity (ICM-2D Model) manufactured by SUGA TEST INSTRUMENTS Co., Ltd. The area of a sample to be measured was 50 mm×50 mm and an optical wedge of 0.5 mm in width was used. The term "image clarity" is a criterion for determining when an object is reflected on the surface of a coating, how much the reflected image is clear and less distorted. The study revealed that a large or small value of the image clarity (herein called as clearness of transmitted image) measured by using an optical wedge of 0.5 mm in width in particular is a barometer about whether the sample is able to cope with the making to a high precision monitor, or not. The foregoing measuring apparatus and fundamentals are widely known by JIS K 7105 (a test method of optical characteristics of the plastics) as a method of measuring image clarity of the transmitted image. It has already been decided that such method in ISO/TC 79/SC 1 is prepared as an ISO Technical Report. This method comprises the steps of measuring a reflected light from a sample through a moving optical wedge, and then obtaining the value of image clarity by calculation. In the case where the sample causes image ambiguity, a slit image formed on the optical wedge becomes broad (thick) owing to the image ambiguity. Consequently both ends of the slit image at the position of transmission section overlap with an opaque section, so that a quantity of light which is initially 100%, decreases. On the other hand, at the position of the opaque section, a quantity of light which is initially 0%, increases, because light comes from through the opaque section overlapping with both the ends of the slit image. Thus, the value of clearness of the transmitted image which is obtained by means of an instrument for measuring image clarity is defined by the following formula based on the maximum value M of the transmitted light at the transparent section and the minimum value m of the opaque section of the optical wedge:

Value of Clearness of Transmitted Image $C (\%) = \{(M-m)/(M+m)\} \times 100$

The formula shows that the larger the value of C is, the higher the clearness of the transmitted image is, whereas if the value of C is small, the transmitted image has "ambiguity" or "distortion". (*Toso Gijutsu* (*Coating Technique*), 1985 July, Shazosei Sokuteiki (Instruments for Measuring Image Clarity), Suga and Mitamula)

With regard to the anti-glare and anti-reflection film which is able to cope with a high precision monitor, the value of clearness of the transmitted image, which can be obtained by using an optical wedge of 0.5 mm in width, is preferably in the range of 30% to 70%, more preferably in the range of 35% to 60%.

The adjustment of the clearness of transmitted image can be carried out by controlling "a thickness of anti-glare layer", "a size of matt particles", "a frequency of matt particles (a coating amount, contents)", "a degree of dispersion of particles", "the affinity of the particles for a binder", and the like.

Further, with regard to a combination of the haze and the value of clearness of the transmitted image, it is preferred that the haze is from 5% to 18% and the value of clearness of the transmitted image is from 30% to 70%, and it is more preferred that the haze is from 8% to 15% and the value of clearness of the transmitted image is from 35% to 60%.

Further another preferable embodiments of the anti-glare and anti-reflection film of the present invention include the followings:

(i) An anti-glare and anti-reflection film comprising a transparent support having thereon, at least one anti-glare layer and a low refractive index layer having a refractive index of 1.38 to 1.49, superposed in this order, wherein the overall haze of said anti-glare and anti-reflection film is from 3.0% to 20.0%, and wherein said anti-glare and anti-reflection film has the value of optical contact index ranging from 15% to 65% at the wavelength of 0.5 μm, under applied load conditions of 1.57 MPa.

(ii) An anti-glare and anti-reflection film comprising a transparent support having thereon, at least one anti-glare layer and a low refractive index layer having a refractive index of 1.38 to 1.49, superposed in this order, wherein the overall haze of said anti-glare and anti-reflection film is from 3.0% to 20.0%, and wherein said anti-glare and anti-reflection film has the value of clearness of the transmitted image ranging from 30% to 70%, said value being measured by means of an instrument for measuring image clarify, using an optical wedge of 0.5 mm in width.

The respective layers of the anti-glare and anti-reflection film of the present invention can be formed by applying a coating solution for forming each layer, according to any one method of dip coat, air knife coat, curtain coat, roller coat, wire bar coat, gravure coat, and extrusion coat (as described in U.S. Pat. No. 2,681,294), and, if necessary, subjecting to irradiation of radiation or heating. Two or more layers may be applied at the same time. The method for application of two or more layers at the same time is described, for example, in U.S. Pat. Nos. 2,761,791, 2,941,898, 3,508,947, and 3,526,528, and in p. 253 of "Coating Kogaku (Coating Engineering)" written by Yuji Harasaki and published by Asakura Syoten (1973).

The anti-glare and anti-reflection film of the present invention can be used in an image display device, such as a liquid crystal display device (LCD), a plasma display panel (PDP), an electroluminescence display (ELD), and a cathode-ray tube display device (CRT). The anti-glare and anti-reflection film of the present invention can be applied on the image display device so that the transparent support side of the film and the surface of the image display (screen) are adhered. When the anti-glare and anti-reflection film of the present invention is applied to the surface or internal surface of an LCD, it is preferably used as it is as one film among two protective films for protecting a polarizing layer of a polarizing plate. The use of an optical compensation film having optical anisotropy as the other protective film is more preferable because it also produces the effect of expanding the angle of visibility.

The anti-glare and anti-reflection film of the present invention can be manufactured simply and inexpensively, only by forming an anti-glare layer and a low refractive index layer on a support. Further, the anti-glare and anti-reflection film exhibits sufficient properties of anti-reflection, scratch resistance and anti-stain, and in addition it hardly causes change in coloration and it is less in uneven color.

Further, the polarizing plate and the image display device, such as a liquid crystal display device, of the present invention are effectively prevented from the reflection of an outer light, to give excellent contrast, and further they are excellent in properties of anti-stain and scratch resistance.

According to the anti-glare and anti-reflection film of the preferable embodiment of the present invention, in addition that they are simple and imexpensive as well as they have excellent properties of anti-reflection and anti-glare, further they can have high precision property. Further, the polarizing plate and the image display device of the present invention, each of which uses the above-mentioned anti-glare and anti-reflection film, have excellent properties of anti-reflection, anti-glare and high precision.

In order to explain the present invention in more detail, the present invention will be described by way of examples hereinafter, but the present invention is not limited to these examples.

EXAMPLES (Preparation of a Coating Solution 1-A for an Anti-Glare Layer)

125 g of a mixture of dipentaerythritol pentaacrylate and dipentaerythritol hexaacrylate (trade name: DPHA, manufactured by Nippon Kayaku Co., Ltd.) and 125 g of bis(4-methacryloylthiophenyl)sulfide (trade name: MPSMA, manufactured by Sumitomo Seika Chemicals co., Ltd.) were dissolved in 439 g of a mixed solvent of methyl ethyl ketone/cyclohexanone (50/50% by weight). To the resulting solution was added a solution obtained by dissolving 5.0 g of a photopolymerization initiator (trade name: Irgacure 907, manufacture by Ciba Geigy Co.) and 3.0 g of a photosensitizer (trade name: KAYACURE DETX, manufactured by Nippon Kayaku Co., Ltd.) in 49 g of methyl ethyl ketone. The coating film obtained by applying this solution, and then curing the applied solution using ultraviolet rays, had a refractive index of 1.60.

10 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare a coating solution 1-A for an anti-glare layer.

(Preparation of a Coating Solution 1-B for an Anti-Glare Layer)

217.0 g of a hardcoat coating solution containing a dispersion of zirconium oxide (Desolite KZ-7886A (trade name), manufactured by JSR Corporation) was added to a mixed solvent of 104.1 g of cyclohexanone and 61.3 g of methyl ethyl ketone, while stirring using an air disperser. The coating film obtained by applying this solution, and then by curing the applied solution using ultraviolet rays, had a refractive index of 1.61.

5 g of crosslinkable polystyrene particles (trade name: SX-200H, manufactured by Soken Chemical & Engineering Co., Ltd.) having an average particle diameter of 2 μm was added to this solution, and the mixture was stirred for one hour using a high speed disperser at 5000 rpm to disperse, followed by filtration using a polypropylene filter having a pore diameter of 30 μm, to prepare a coating solution 1-B for an anti-glare layer.

(Preparation of a Coating Solution 1-C for an Anti-Glare Layer)

91 g of a mixture of dipentaerythritol pentaacrylate and dipentaerythritol hexaacrylate (DPHA (trade name), manufactured by Nippon Kayaku Co., Ltd.), 199 g of a hardcoat coating solution containing a dispersion of zirconium oxide (Desolite KZ-7115 (trade name), manufactured by JSR Corporation), and 19 g of a hardcoat coating solution containing a dispersion of zirconium oxide (Desolite KZ-7161 (trade name), manufactured by JSR Corporation), were dissolved in 52 g of a mixed solvent of methyl ethyl ketone/cyclohexanone (54/46% by weight). To the thus-obtained solution, 10 g of a photopolymerization initiator (Irgacure 907 (trade name), mmanufactured by Chiba Geigy Co.) was added. The coated film obtained by applying this solution, and then curing the applied solution using ultraviolet rays, had a refractive index of 1.61.

Further, to the foregoing solution, 29 g of a dispersion liquid prepared by adding 20 g of cross-linkable polystyrene particles having an average particle size of 2 $\mu$m (trade name: SX-200H, manufactured by Soken Chemical & Engineering Co., Ltd.) into 80 g of a mixed solvent of methyl ethyl ketone/cyclohexanone 54/46% by weight and stirred at 5000 rpm by means of a high speed disperser for 1 hour to disperse them, was added and stirred. Thereafter, the resulting mixture was filtered with a polypropylene filter having a pore size of 30 $\mu$m, to prepare a coating solution for an anti-glare layer.

(Preparation of Coating Solution 1-D for a Hard Coat Layer)

250 g of an ultraviolet-curable hard coat composition (Desolite KZ-7689 (trade name), 72% by weight, manufactured by JSR Co., Ltd.) was dissolved in a mixture of 62 g of methyl ethyl ketone and 88 g of cyclohexanone, to prepare a solution. A refractive index of the coated film, which was prepared by coating the resulting solution, followed by ultraviolet curing, was 1.53.

Further, the solution was filtered with a polypropylene filter having a pore size of 30 $\mu$m, to -prepare a coating solution for a hard coat layer.

(Preparation of a Coating Solution 1-A for a Low-Refractive-Index Layer)

8 g of MEK-ST ((trade name), average particle diameter: 10 to 20 nm, solid content concentration: 30% by weight, a $SiO_2$ sol of MEK dispersion, manufactured by Nissan Chemical Industries, Co., Ltd.) and 100 g of methyl ethyl ketone were added to 93 g of a thermally crosslinkable fluorine-containing polymer (trade name: JN-7228, manufactured by JSR Corporation) having a refractive index of 1.42. The mixture was stirred, and then subjected to filtration using a polypropylene filter having a pore diameter of 1 $\mu$m, to prepare a coating solution for a low-refractive-index layer.

Example 1-1

The aforementioned coating solution 1-D for a hardcoat layer was applied to an 80-$\mu$m-thickness triacetyl cellulose film (trade name: TAC-TD80U, manufactured by Fuji Photo Film Co., Ltd.) by using a bar coater, and dried at 120° C. Ultraviolet rays were then irradiated to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 2.5 $\mu$m.

The aforementioned coating solution 1-A for an anti-glare layer was applied onto the hardcoat layer by using a bar coater, and dried and cured by ultraviolet rays in the same conditions as in the preparation of the hardcoat layer, to form an anti-glare layer having a thickness of about 1.5 $\mu$m.

The aforementioned coating solution 1-A for a low-refractive-index layer was applied onto the anti-glare layer by using a bar coater. The coating solution was dried at 80° C., and further heated at 120° C. for 10 min to carry out thermal crosslinking, to form a low-refractive-index layer with a thickness of 0.096 $\mu$m. The thus-formed low-reflective-index layer had the refractive index of 1.43.

Example 1-2

A hardcoat layer was formed on an 80-$\mu$m-thickness triacetyl cellulose film (TAC-TD80U (trade name), manufactured by Fuji Photo Film Co., Ltd.) in the same manner as in Example 1-1.

The aforementioned coating solution 1-B for an anti-glare layer was applied onto the hardcoat layer by using a bar coater, and dried and cured by ultraviolet rays in the same conditions as in the preparation of the above hardcoat layer, to form an anti-glare layer having a thickness of about 1.5 $\mu$m.

The aforementioned coating solution 1-A for a low-refractive-index layer was applied onto the anti-glare layer by using a bar coater. The coating solution was dried at 80° C. and further heated at 120° C. for 10 min to carry out thermal crosslinking, to form a low-refractive-index layer with a thickness of 0.096 $\mu$m.

Example 1-3

A hardcoat layer was formed on an 80-$\mu$m-thickness triacetyl cellulose film (TAC-TD80U (trade name), manufactured by Fuji Photo Film Co., Ltd.) in the same manner as in Example 1-1.

The aforementioned coating solution 1-C for an anti-glare layer was applied onto the hardcoat layer by using a bar coater, and dried and cured by ultraviolet rays in the same conditions as in the preparation of the hardcoat layer, to form an anti-glare layer having a thickness of about 1.5 $\mu$m.

The aforementioned coating solution 1-A for a low-refractive-index layer was applied onto the anti-glare layer by using a bar coater. The coating solution was dried at 80° C., and further heated at 120° C. for 10 min to carry out thermal crosslinking, to form a low-refractive-index layer with a thickness of 0.096 $\mu$m.

Comparative Example 1-1

The aforementioned coating solution 1-D for a hardcoat layer was applied onto an 80-$\mu$m-thickness triacetyl cellulose film (TAC-TD80U (trade name), manufactured by Fuji Photo Film Co., Ltd.) by using a bar coater, and the thus-coated solution was dried at 120° C. Ultraviolet rays were then irradiated to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 4 $\mu$m.

A coating solution for an anti-glare layer that contained the same components as in the aforementioned coating solution 1-A for an anti-glare layer, except that all the MPSMA was replaced by DPHA, was prepared. The thus-prepared coating solution for an anti-glare layer was applied onto the hardcoat layer by using a bar coater, and dried and cured by ultraviolet rays in the same conditions as in the preparation of the hardcoat layer, to form an anti-glare layer having a thickness of about 1.5 $\mu$m and a refractive index of 1.51.

The aforementioned coating solution 1-A for a low-refractive-index layer was applied onto the anti-glare layer by using a bar coater. The coated solution was dried at 80° C., and further heated at 120° C. for 10 min to carry out thermal crosslinking, to form a low-refractive-index layer having a thickness of 0.096 $\mu$m.

(Evaluation of Anti-Reflection Film)

The obtained films were subjected to evaluation with regard to the following items:

(1) Mirror Reflectance and Coloration

A mirror reflectance of an outgoing angle −5 degrees at an incidence angle of 5 degrees in the wavelength region of 380 nm to 780 nm was measured by means of a spectrophotometer V-550 (trade name, manufactured by JASCO Corporation) equipped with an adapter ARV-474. Then, the average reflectance in the wavelength region of 450 to 650 nm was calculated, to evaluate an anti-reflection performance.

Further, from the measured reflection spectrum, calculated were L*, a* and b* values of CIE 1976 L*a*b* color space, which represents coloration of a light regularly reflected to a light incident at an angle of 5 degrees from the CIE standard light source $D_{65}$, to thereby evaluate the coloration of the reflected light.

(2) Integral Reflectance

An integral reflectance at an incidence angle of 5 degrees in the wavelength region of 380 nm to 780 nm was measured by means of a spectrophotometer V-550 (trade name, manufactured by JASCO Corporation) equipped with an adapter ILV-471. Then, the average reflectance in the wavelength region of 450 to 650 nm was calculated.

(3) Haze

A haze of each of the resultant films was measured using a haze meter Model 1001DP (trade name, manufactured by Nihon Denshoku Kogyo KK).

(4) Evaluation of Pencil Scratching (Hardness) Test

The evaluation of pencil scratching test disclosed in JIS K 5400 was carried out, as an index of scratch-resistance. After adjusting moisture of the anti-glare and anti-reflection film at a temperature of 25° C. and a relative humidity of 60% RH for 2 hours, a scratch test was carried out according to JIS S 6006 by using test pencil of 3H, under a load of 1 kg. Scratch formation was evaluated according to the following criteria.

In the evaluation of n=5, no scratch was detected.: ○
In the evaluation of n=5, 1 or 2 scratch marks were detected.: Δ
In the evaluation of n=5, at least 3 scratch marks were detected.: X (5) Measurement of Contact Angle As an index of stain-proofing property (fingerprint adhesion) of the surface of an optical material, the moisture of the optical material was adjusted at a temperature of 25° C. and a humidity of 60% RH for 2 hours. Thereafter, its contact angle with water was measured.

(6) Measurement of Dynamic Friction Coefficient

The measurement of dynamic friction coefficient was carried out as an index of a surface-sliding property. The sample film was adjusted in humidity at 25° C. and a relative humidity of 60% RH for 2 hours, and then a dynamic friction coefficient of the resultant sample was measured by a HEIDON-14 (trade name) dynamic friction tester under conditions of employing stainless steel balls having a diameter of 5 mmϕ, a load of 100 g, at a velocity of 60 cm/min.

(7) Evaluation of Anti-Glare Property

An image of a fluorescent lamp (8000 $cd/m^2$) without any louver was projected on the produced anti-glare and anti-reflection film, and then the degree of the blur (ambiguity) of the reflection image was evaluated according to the following criteria.

The outline of the fluorescent lamp was not recognized at all.: ⊚

The outline of the fluorescent lamp was slightly recognized.: ○

The fluorescent lamp was blurred, but the outline thereof was able to be recognized.: Δ

The fluorescent lamp was hardly blurred.: X

The results which were obtained in the Examples and the Comparative examples are shown in Table 1.

The results shown in Table 1 reveal the following:

The anti-glare and anti-reflection films according to the Examples 1-1, 1-2 and 1-3 each were excellent in both performances of anti-glare and anti-reflection, and in addition less in change of coloration of the reflected light. Further, they exhibited excellent evaluation results which reflected film properties such as a pencil hardness, a finger print adhesion, and a kinetic friction coefficient.

On the other hand, in the Comparative example 1-1, a sufficient anti-reflection performance was not obtained on account that the refractive index of the anti-glare layer was low.

TABLE 1

| | Average reflectance {%} | | Haze | Pencil hardness | Contact angle | Coloration | Dynamic friction | Anti-glare |
|---|---|---|---|---|---|---|---|---|
| | Mirror | Integral | (%) | (3H) | (degree) | L*/a*/b* | coefficient | property |
| Example 1-1 | 1.1 | 2.0 | 8 | ○ | 103 | 10/1.9/1.3 | 0.08 | ⊚ |
| Example 1-2 | 1.1 | 2.0 | 8 | ○ | 103 | 9/2.0/−4.0 | 0.08 | ⊚ |
| Example 1-3 | 1.1 | 2.0 | 12 | ○ | 103 | 9/1.7/0.2 | 0.08 | ⊚ |
| Comparative example 1-1 | 2.5 | 3.5 | 8 | ○ | 103 | 23/1.0/1.3 | 0.08 | ⊚ |

Then, an anti-glare and anti-reflection polarizing plate was manufactured using the anti-glare and anti-reflection film of Example 1-3. Using this polarizing plate, a liquid crystal display device in which the anti-reflection layer was disposed on the outermost surface was manufactured. As a consequence, the device exhibited excellent contrast with no reflective imaging by the reflection of external light. Also, the device exhibited excellent anti-glare property and visibility with an inconspicuous reflected image, and it exhibited good fingerprint resistance.

(Preparation of a Coating Solution 2-A for a Hard Coat Layer)

250 g of a mixture of dipentaerythritol pentaacrylate and dipentaerythritol hexaacrylate (DPHA (trade name), made by Nippon Kayaku Co., Ltd.) was dissolved in 439 g of a mixture solvent of methyl ethyl ketone and cyclohexanone (50/50% by weight). To the resultant solution was added a solution in which 7.5 g of a photopolymerization initiator (Irgacure 907 (trade name), made by Chiba Geigy Co.) and 5.0 g of a photosensitizer (Kayacure DETX (trade name), made by Nippon Kayaku Co., Ltd.) were dissolved in 49 g of methyl ethyl ketone. When this solution was applied and cured by ultraviolet rays to obtain a coating film, the refractive index thereof was 1.53.

This solution was further filtrated with a filter made of polypropylene and having pores of 3 μm in diameter, to prepare a coating solution for a hard coat layer.

(Preparation of a Coating Solution 2-B for an Anti-Glare Layer)

217.0 g of a hardcoat coating solution containing a dispersion of titanium dioxide (trade name: KZ-7991, manufactured by JSR Corporation) was added to a mixed solvent of 104.1 g of cyclohexanone and 61.3 g of methyl ethyl ketone, while stirring using an air disperser. The coating film obtained by applying this solution, and then by curing the applied solution using ultraviolet rays, had a refractive index of 1.70.

Crosslinkable polystyrene particles (trade name: SX-200H, manufactured by Soken Chemical & Engineering Co., Ltd.) having an average particle diameter of 2 μm was added to this solution, and the mixture was stirred for one hour using a high speed disperser at 5000 rpm to disperse, followed by filtration using a polypropylene filter having a pore diameter of 3 μm, to prepare a coating solution for an anti-glare layer. The amount of cross-linkable polystyrene particles to be added was adjusted so that the value of optical contact index at the wavelength of 0.5 μm under applied load conditions of 1.57 MPa would be 25% according to the following method: The anti-glare layer was formed to have 1.4 μm in thickness of the dry film. Fixing to this thickness, a calibration curve of the value of optical contact index of the anti-glare and anti-reflection film, to the amount of cross-linking polystyrene particles to be added was prepared experimentally.

(Preparation of a Coating Solution 2-C for an Anti-Glare Layer)

217.0 g of a hardcoat coating solution containing a dispersion of zirconium oxide (trade name: KZ-7115, manufactured by JSR Corporation) was added to a mixed solvent of 104.1 g of cyclohexanone and 61.3 g of methyl ethyl ketone, while stirring using an air disperser. The coating film obtained by applying this solution, and then curing the applied solution using ultraviolet rays, had a refractive index of 1.61.

Crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare a coating solution for an anti-glare layer. The amount of cross-linkable polystyrene particles to be added was adjusted so that the value of optical contact index at the wavelength of 0.5 μm under applied load conditions of 1.57 MPa would be 25% according to the following method: An anti-glare layer was formed to have 1.4 μm in thickness of the dry film. Fixing to this thickness, a calibration curve of the value of optical contact index of the anti-glare and anti-reflection film, to the amount of cross-linking polystyrene particles to be added was prepared experimentally.

(Preparation of a Coating Solution 2-A for a Low-Refractive-Index Layer)

18 g of a silica sol (trade name: MEK-ST, average particle diameter: 10 to 20 nm, solid content concentration: 30% by weight, manufactured by Nissan Chemical Industries, Co., Ltd.) and 245 g of methyl ethyl ketone were added to 210 g of a thermally crosslinkable fluorine-containing polymer (trade name: JN-7228, solid content concentration: 6% by weight, manufactured by JSR Corporation) having a refractive index of 1.42. The mixture was stirred, and then subjected to filtration using a polypropylene filter having a pore diameter of 1 μm, to prepare a coating solution for a low-refractive-index layer.

Example 2-1B

The aforementioned coating solution 2-A for a hardcoat layer was applied onto an 80-μm-thickness triacetyl cellulose film (trade name: TAC-TD80U, manufactured by Fuji Photo Film Co., Ltd.) by using a bar coater, and dried at 120° C. Ultraviolet rays were then irradiated to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 4 μm.

The aforementioned coating solution 2-B for an anti-glare layer was applied onto the hardcoat layer by using a bar coater, and dried and cured by ultraviolet rays in the same conditions as in the preparation of the hardcoat layer, to form an anti-glare layer having a thickness of about 1.4 μm.

The aforementioned coating solution 2-A for a low-refractive-index layer was applied onto the anti-glare layer by using a bar coater. The applied coating solution was dried at 80° C., and further heated at 120° C. for 10 min to carry out thermal crosslinking, to form a low-refractive-index layer with a thickness of 0.096 μm. The thus-formed low-refractive-index layer had the refractive index of 1.43. The value of optical contact index of this sample was 25%.

This sample corresponds to a film which has another hard coating layer formed by the coating solution 2-A, between the support 11 and the anti-glare layer 12 in the foregoing FIG. 2.

Example 2-2B

A sample was prepared in the same manner as the Example 2-1B sample, except that without changing the particle concentration in the coating solution for the anti-glare layer in Example 2-1B, the concentration of other solid substances was reduced (i.e., only the thickness of the film was made thinner, while keeping the particle frequency constant), so that the value of optical contact index (load: 1.57 MPa, wavelength: 0.5 μm) of the anti-glare and anti-reflection film would be 20%. The thus-obtained sample was designated as Example 2-2B sample.

Example 2-3B

A sample was prepared in the same manner as the Example 2-1B sample, except that without changing the particle concentration in the coating solution for the anti-glare layer in Example 2-1B, the concentration of other solid substances was reduced (i.e., only the thickness of the film was made thinner, while keeping the particle frequency constant), so that the value of optical contact index (load: 1.57 MPa, wavelength: 0.5 μm) of the anti-glare and anti-reflection film would be 15%. The thus-obtained sample was designated as Example 2-3B sample.

Example 2-4B

A sample was prepared in the same manner as the Example 2-1B sample, except that without changing the particle concentration in the coating solution for the anti-glare layer in Example 2-1B, the concentration of other solid substances was increased (i.e., only the thickness of the film was made thicker, while keeping the particle frequency constant), so that the value of optical contact index (load: 1.57 MPa, wavelength: 0.5 μm) of the anti-glare and anti-reflection film would be 35%. The thus-obtained sample was designated as Example 2-4B sample.

Example 2-5B

A sample was prepared in the same manner as the Example 2-1B sample, except that without changing the particle concentration in the coating solution for the anti-glare layer in Example 2-1B, the concentration of other solid substances was increased (i.e., only the thickness of the film was made thicker, while keeping the particle frequency constant), so that the value of optical contact index (load: 1.57 MPa, wavelength: 0.5 µm) of the anti-glare and anti-reflection film would be 45%. The thus-obtained sample was designated as Example 2-5B sample.

Comparative Example 2-1B

A sample was prepared in the same manner as the Example 2-1B sample, except that without changing the particle concentration in the coating solution for the anti-glare layer in Example 2-1B, the concentration of other solid substances was increased (i.e., only the thickness of the film was made thicker, while keeping the particle frequency constant), so that the value of optical contact index (load: 1.57 MPa, wavelength: 0.5 µm) of the anti-glare and anti-reflection film would be 70%. The thus-obtained sample was designated as Comparative example 2-1B sample.

Comparative Example 2-2B

A sample was prepared in the same manner as the Example 2-1B sample, except that without changing the particle concentration in the coating solution for the anti-glare layer in Example 2-1B, the concentration of other solid substances was increased (i.e., only the thickness of the film was made thicker, while keeping the particle frequency constant), so that the value of optical contact index (load: 1.57 MPa, wavelength: 0.5 µm) of the anti-glare and anti-reflection film would be 80%. The thus-obtained sample was designated as Comparative example 2-2B sample.

Example 2-1C

A sample was prepared in the same manner as the Example 2-1B sample, except that the coating solution 2-C for an anti-glare layer was used in place of the coating solution 2-B for an anti-glare layer in Example 2-1B. The thus-obtained sample was designated as Example 2-1C sample.

Examples 2-2C to 2-5C and Comparative Examples 2-1C to 2-2C

According to the same idea as replacement of the Example 2-1B sample with the Example 2-1C sample, in the preparation of the samples of Examples 2-2B to 2-5B and Comparative examples 2-1B to 2-2B, the coating solution 2-C for an anti-glare layer was used in place of the coating solution 2-B for the anti-glare layer. At this time, without changing the concentration of the solid content as the matt agent in the coating solution, the concentration of other solid substances was increased or decreased so as to meet a respective desired value of optical contact index. The thus-obtained samples were designated as samples of Examples 2-2C to 2-5C and Comparative examples 2-1C to 2-2C, respectively.

(Evaluation of the Anti-Glare and Anti-Reflection Film)

As for the thus-prepared anti-glare and anti-reflection films, the following items were evaluated:

(11) Haze

Haze of the resultant films were measured and evaluated in the same manner as described in the above.

(12) Evaluation of Optical Contact Index

With regard to the thus-prepared anti-glare and anti-reflection film, the optical contact index at the wavelength of 0.5 µm was measured, under applied load conditions of 1.57 MPa, by means of a microtopograph manufactured by TOYO SEIKI SEISAKU-SHO, LTD. The value of 100% in terms of optical contact index means that when the load of 1.57 MPa is applied, the surface of a film is optically flat. The study revealed that the value of optical contact index would be an important indicator (barometer) when developing an anti-glare and anti-reflection film capable of coping with a high precision monitor.

(13) Evaluation of Anti-Glare Property

An image of a fluorescent lamp (8000 cd/m$^2$) without any louver was projected on the produced anti-glare and anti-reflection film, and then the degree of the blur of the reflection image was evaluated according to the following criteria.

The outline of the fluorescent lamp was not recognized at all or was not almost recognized.: ⊚

The outline of the fluorescent lamp was slightly recognized.: ○

The fluorescent lamp was blurred, but the outline thereof was able to be recognized.: Δ

The fluorescent lamp was hardly blurred.: X

(14) Evaluation of Adaptability in High Precision Monitor

In order to evaluate the adaptability of the anti-glare and anti-reflection film in a high precision monitor, the prepared anti-glare and anti-reflection film was superposed so as to closely contact on PC-PJ2-X4 monitor (trade name) manufactured by SHARP CORPORATION. Then, a sensuous evaluation was conducted by the naked eyes according to the criteria (ranks) described below. Herein, assuming that one pixel is composed of integrated three colors of R, G and B, a monitor in which the size of one pixel is about 200 µm×200 µm, or less, is called a high precision monitor. The term "glare" herein used does not mean an existence of the glare (dazzle) of the light owing to a reflection of illumination such as an electric light as discussed on the anti-glare performance, but means that R, G and B colors look glaring (glistening) to human eyes on account of magnification of the pixels owing to a lens effect which the film causes.

Completely or almost no glare was found.: ⊚

Glare was slightly found.: ○

Some extent of glare was found.: Δ

Glare was clearly found.: X

(15) Average Mirror Reflectance

Test and evaluation were carried out in the same manner as above.

The results which were obtained in Examples and Comparative examples are shown in Table 2. It is understood that each of Examples 2-1B to 2-5B samples was the anti-glare and anti-reflection film capable of coping with a high precision monitor. It can be understood that such the excellent effects that both the properties of anti-glare and high precision were exhibited, by adjusting the value of optical contact index, which was attained with the applied load of 1.57 MPa and wavelength of 0.5 µm, in the range of 15% to 65%.

Similar results as the above were obtained with regard to the Examples 2-1C to 2-5C samples and the Comparative examples 2-1C to 2-2C samples.

TABLE 2

| Sample No. | Haze (%) | Optical contact index (%) | Anti-glare property | High-precision adaptability | Average mirror reflection index (%) |
|---|---|---|---|---|---|
| Example 2-1B | 13 | 25 | ⊚ | ⊚ | 1.0 |
| Example 2-2B | 15 | 20 | ⊚ | ⊚ | 1.0 |
| Example 2-3B | 18 | 15 | ⊚ | ○ | 0.9 |
| Example 2-4B | 10 | 35 | ⊚ | ⊚ | 1.1 |
| Example 2-5B | 8 | 45 | ⊚ | ⊚ | 1.2 |

TABLE 2-continued

| Sample No. | Haze (%) | Optical contact index (%) | Anti-glare property | High-precision adaptability | Average mirror reflection index (%) |
|---|---|---|---|---|---|
| Comparative Example 2-1B | 4 | 70 | Δ (N.G.) | ◎ | 1.4 |
| Comparative Example 2-2B | 3 | 80 | X (N.G.) | ◎ | 1.4 |

Separately, anti-glare and anti-reflection polarizing plates were manufactured using the anti-glare and anti-reflection film of Examples 2-1B to 2-5B and 2-1C to 2-5C, respectively. Using the respective polarizing plate, liquid crystal display devices, in each of which one of the anti-reflection layers (which was the polarizing plate side) was disposed on the outermost surface, were manufactured. As a consequence, these devices exhibited excellent contrast with no reflective imaging by the reflection of external light. Also, the devices exhibited excellent anti-glare property and visibility with inconspicuous reflected image, and furthermore they exhibited high precision adaptability.

Another Examples of the present invention will be hereinafter explained. First, the triacetyl cellulose film support to be used will be explained.

1. Production of a Triacetyl Cellulose Film Support I
(Preparation of a Triacetyl Cellulose Dope A)

Raw materials composed of 17.4 parts by mass of triacetyl cellulose, 2.6 parts by mass of triphenyl phosphate, 66 parts by mass of dichloromethane, 5.8 parts by mass of methanol and 8.2 parts by mass of normal butanol were mixed together, with stirring, to dissolve them each other, thereby preparing a triacetyl cellulose dope A.

(Preparation of a Triacetyl Cellulose Dope B)

Raw materials composed of 24 parts by mass of triacetyl cellulose, 4 parts by mass of triphenyl phosphate, 66 parts by mass of dichloromethane and 6 parts by mass of methanol were mixed with stirring to dissolve, thereby preparing a triacetyl cellulose dope B.

The three-layer co-casting die was used according to JP-A-11-254594, to arrange such that the dope A was co-cast on both sides of the dope B, thereby discharging these dopes on a metal drum at the same time, to perform multilayer casting. Then, the cast film was peeled from the drum and dried, to form a triacetyl cellulose film support I with co-cast three layers with thicknesses of 10 μm, 60 μm and 10 μm, from the drum surface side. No clear interface was formed between each layer of the film.

Examples 2-1D to 2-5D, Comparative Examples 2-1D to 2-2D, Examples 2-1E to 2-5E and Comparative Examples 2-1E to 2-2E The same procedures as in Examples 2-1B to 2-5B, Comparative Examples 2-1B to 2-2B, Examples 2-1C to 2-5C and Comparative Examples 2-1C to 2-2C were carried out, except that the 80-μm-thickness triacetyl cellulose film used in each of these Examples and Comparative Examples was replaced by the aforementioned triacetyl cellulose film support I, to produce samples of Examples 2-1D to 2-5D, Comparative Examples 2-1D to 2-2D, Examples 2-1E to 2-5E and Comparative Examples 2-1E to 2-2E, respectively.

The thus-obtained samples of Examples 2-1D to 2-5D, Comparative Examples 2-1D to 2-2D, Examples 2-1E to 2-5E and Comparative Examples 2-1E to 2-2E were evaluated in the same manner as above. As a result, any difference due to the support was not found and the similar results as those of Examples 2-1B to 2-5B and Comparative Examples 2-1B to 2-2B were obtained.

(Preparation of a Coating Solution 3-B for an Anti-Glare Layer)

217.0 g of a hardcoat coating solution containing a dispersion of titanium dioxide (trade name: KZ-7991, manufactured by JSR Corporation) was added to a mixed solvent of 104.1 g of cyclohexanone and 61.3 g of methyl ethyl ketone, while stirring using an air disperser. The coating film obtained by applying this solution, and then by curing the applied solution using ultraviolet rays, had a refractive index of 1.70.

Crosslinkable polystyrene particles (trade name: SX-200H, manufactured by Soken Chemical & Engineering Co., Ltd.) having an average particle diameter of 2 μm was added to this solution, and the mixture was stirred for one hour using a high speed disperser at 5000 rpm to disperse, followed by filtration using a polypropylene filter having a pore diameter of 3 μm, to prepare a coating solution for an anti-glare layer. The amount of cross-linkable polystyrene particles to be added was adjusted so that the value of clearness of the transmitted image would be 40% according to the following method: The anti-glare layer was formed to have 1.4 μm in thickness of the dry film. Fixing to this thickness, a calibration curve of the value of clearness of the transmitted image of the anti-glare and anti-reflection film, to the amount of cross-linkable polystyrene particles to be added was prepared experimentally. The value of clearness of the transmitted image was measured by means of an instrument for measuring image clarity using an optical wedge of 0.5 mm in width.

(Preparation of a Coating Solution 3-C for an Anti-Glare Layer)

217.0 g of a hardcoat coating solution containing a dispersion of zirconium oxide (trade name: KZ-7115, manufactured by JSR Corporation) was added to a mixed solvent of 104.1 g of cyclohexanone and 61.3 g of methyl ethyl ketone, while stirring using an air disperser. The coating film obtained by applying this solution, and then curing the applied solution using ultraviolet rays, had a refractive index of 1.61.

Crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm, to prepare a coating solution for an anti-glare layer. The amount of cross-linkable polystyrene particles to be added was adjusted so that the value of clearness of the transmitted image would be 40% according to the following method:

The anti-glare layer was formed to have 1.4 μm in thickness of the dry film. Fixing to this thickness, a calibration curve of the value of clearness of the transmitted image of the anti-glare and anti-reflection film, to the amount of cross-linkable polystyrene particles to be added was prepared experimentally. The value of clearness of the transmitted image was measured by means of an instrument for measuring image clarity using an optical wedge of 0.5 mm in width.

Example 3-1B

The aforementioned coating solution 2-A for a hardcoat layer was applied onto an 80-μm-thickness triacetyl cellulose film (trade name: TAC-TD80U, manufactured by Fuji Photo Film Co., Ltd.) by using a bar coater, and dried at 120° C. Ultraviolet rays were then irradiated to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 4 μm.

The aforementioned coating solution 3-B for an anti-glare layer was applied onto the hardcoat layer by using a bar coater, and dried and cured by ultraviolet rays in the same conditions as in the preparation of the hardcoat layer, to form an anti-glare layer having a thickness of about 1.4 μm.

The aforementioned coating solution 2-A for a low-refractive-index layer was applied onto the anti-glare layer by using a bar coater. The coating solution was dried at 80° C., and further heated at 120° C. for 10 min to carry out thermal crosslinking, to form a low-refractive-index layer with a thickness of 0.096 μm. The thus-formed low-refractive-index layer had the refractive index of 1.43. The value of clearness of the transmitted image of the resultant sample was 40%.

This sample corresponds to one which has another hard coating layer formed by the coating solution 2-A, between the support 11 and the anti-glare layer 12 in the foregoing FIG. 2.

Example 3-2B

A sample was prepared in the same manner as the Example 3-1B sample, except that without changing the particle concentration in the coating solution for the anti-glare layer in Example 3-1B, the concentration of other solid substances was reduced (i.e., only the thickness of the film was made thinner, while keeping the particle frequency constant), so that the value of clearness of the transmitted image of the anti-glare and anti-reflection film (obtained by using an optical wedge of 0.5 mm in width) would be 35%. The thus-obtained sample was designated as Example 3-2B sample.

Example 3-3B

A sample was prepared in the same manner as the Example 3-1B sample, except that without changing the particle concentration in the coating solution for the anti-glare layer in Example 3-1B, the concentration of other solid substances was reduced (i.e., only the thickness of the film was made thinner, while keeping the particle frequency constant), so that the value of clearness of the transmitted image of the anti-glare and anti-reflection film (obtained by using an optical wedge of 0.5 mm in width) would be 30%. The thus-obtained sample was designated as Example 3-3B sample.

Example 3-4B

A sample was prepared in the same manner as the Example 3-1B sample, except that without changing the particle concentration in the coating solution for the anti-glare layer in Example 3-1B, the concentration of other solid substances was increased (i.e., only the thickness of the film was made thicker, while keeping the particle frequency constant), so that the value of clearness of the transmitted image of the anti-glare and anti-reflection film (obtained by using an optical wedge of 0.5 mm in width) would be 50%. The thus-obtained sample was designated as Example 3-4B sample.

Example 3-5B

A sample was prepared in the same manner as the Example 3-1B sample, except that without changing the particle concentration in the coating solution for the anti-glare layer in Example 3-1B, the concentration of other solid substances was increased (i.e., only the thickness of the film was made thicker, while keeping the particle frequency constant), so that the value of clearness of the transmitted image of the anti-glare and anti-reflection film (obtained by using an optical wedge of 0.5 mm in width) would be 60%. The thus-obtained sample was designated as Example 3-5B sample.

Comparative Example 3-1B

A sample was prepared in the same manner as the Example 3-1B sample, except that without changing the particle concentration in the coating solution for the anti-glare layer in Example 3-1B, the concentration of other solid substances was increased (i.e., only the thickness of the film was made thicker, while keeping the particle frequency constant), so that the value of clearness of the transmitted image of the anti-glare and anti-reflection film (obtained by using an optical wedge of 0.5 mm in width) would be 75%. The thus-obtained sample was designated as Comparative example 3-1B sample.

Comparative Example 3-2B

A sample was prepared in the same manner as the Example 3-1B sample, except that without changing the particle concentration in the coating solution for the anti-glare layer in Example 3-1B, the concentration of other solid substances was increased (i.e., only the thickness of the film was made thicker, while keeping the particle frequency constant), so that the value of clearness of the transmitted image of the anti-glare and anti-reflection film (obtained by using an optical wedge of 0.5 mm in width) would be 80%. The thus-obtained sample was designated as Comparative example 3-2B sample.

Example 3-1C

A sample was prepared in the same manner as the Example 3-1B sample, except that the coating solution 3-C for an anti-glare layer was used in place of the coating solution 3-B for an anti-glare layer in Example 3-1B. The thus-obtained sample was designated as Example 3-1C sample.

Examples 3-2C to 3-5C and Comparative Examples 3-1C to 3-2C

According to the same idea as replacement of the Example 3-1B sample with the Example 3-1C sample, in Examples 3-2B to 3-5B and Comparative examples 3-1B to 3-2B, the coating solution 3-C for an anti-glare layer was used in place of the coating solution 3-B for an anti-glare layer. At this time, without changing the concentration of the solid content of the matt agent in the coating solution, the concentration of other solid substances was increased or decreased so as to meet a respective desired value of clearness of the transmitted image. The thus-obtained samples were designated as Examples 3-2C to 3-5C and Comparative examples 3-1C to 3-2C samples, respectively.
(Evaluation of the Anti-Glare and Anti-Reflection Film)

As for the thus-prepared anti-glare and anti-reflection films, the following items were evaluated:
(21) Haze Haze of the resultant films were measured and evaluated in the same manner as described in the above.
(22) Evaluation of Value of Clearness of Transmitted Image With regard to the thus-obtained anti-glare and anti-reflection film, the value of clearness of the transmitted image was measured, using an optical wedge of 0.5 mm in width, by means of an instrument for measuring image clarity, (ICM-2D Model) manufactured by SUGA TEST INSTRUMENTS Co., Ltd. The study revealed that the value of clearness of the transmitted image would be an important indicator (barometer) when developing an anti-glare and anti-reflection film capable of coping with a high precision monitor. It is understood that the larger the value is, the more the film is able to cope with a high precision performance.

(23) Evaluation of Anti-Glare Property
(24) Evaluation of Adaptability in High Precision Monitor
(25) Average Mirror Reflectance With respect to (23) to (25), measurements and evaluations were carried out in the same manner as described in the above.

The results which were obtained in Examples and Comparative examples are shown in Table 3. It is understood that each of Examples 3-1B to 3-5B samples was the anti-glare and anti-reflection film capable of coping with a high precision monitor. It can be understood such the excellent effects that both the properties of anti-glare and high precision were exhibited, by adjusting the value of clearness of the transmitted image, which was obtained by an instrument for measuring image clarity with an optical wedge of 0.5 mm in width, in the range of 30% to 70%.

Similar the same results as the above were obtained with regard to the Examples 3-1C to 3-5C samples and the Comparative examples 3-1C to 3-2C samples.

TABLE 3

| Sample No. | Haze (%) | Clearness of transmitted image (%) | Anti-glare property | High-precision adaptability | Average mirror reflection index (%) |
|---|---|---|---|---|---|
| Example 3-1B | 13 | 40 | ⊚ | ⊚ | 1.0 |
| Example 3-2B | 15 | 35 | ⊚ | ⊚ | 1.0 |
| Example 3-3B | 18 | 30 | ⊚ | ○ | 0.9 |
| Example 3-4B | 10 | 50 | ⊚ | ⊚ | 1.1 |
| Example 3-5B | 8 | 60 | ⊚ | ⊚ | 1.2 |
| Comparative Example 3-1B | 4 | 75 | Δ (N.G.) | ⊚ | 1.4 |
| Comparative Example 3-2B | 3 | 80 | X (N.G.) | ⊚ | 1.4 |

Separately, anti-glare reflection-preventing polarizing plates were manufactured using the anti-glare and anti-reflection film of Examples 3-1B to 3-5B and 3-1C to 3-5C, respectively. Using these polarizing plates, liquid crystal display devices, in each of which one of the anti-reflection layers (the polarizing plate side) was disposed on the outermost surface, were manufactured. As a consequence, these devices exhibited excellent contrast with no reflective imaging by the reflection of external light. Also, the devices exhibited excellent visibility with inconspicuous reflected image since the anti-glare property of the devices were excellent, and furthermore they exhibited high precision adaptability.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An anti-glare and anti-reflection film comprising a transparent support having thereon, an anti-glare layer and at least one low refractive index layer superposed in this order, wherein an average mirror reflectance at an incidence of 5 degrees in the wavelength region of 450 nm to 650 nm is 1.2% or less, wherein the low refractive index layer comprises a cured product of a fluorine-containing resin cross-linkable by heat or ionization radiation, wherein the fluorine-containing resin cross-linkable by heat or ionization radiation comprises a silane compound containing a perfluoroalkyl group.

2. An anti-glare and anti-reflection film comprising a transparent support having thereon, an anti-glare layer and at least one low refractive index layer superposed in this order, wherein an average mirror reflectance at an incidence of 5 degrees in the wavelength region of 450 nm to 650 nm is 1.2% or less, wherein the low refractive index layer comprises a cured product of a fluorine-containing resin cross-linkable by heat or ionization radiation, wherein the fluorine-containing resin cross-linkable by heat or ionization radiation comprises a fluorine-containing co-polymer formed with a monomer for giving a cross-linkable functional group and a fluorine-containing monomer.

3. The anti-glare and anti-reflection film as claimed in claim 1, wherein an average integral reflectance at an incidence of 5 degrees in the wavelength region of 450 nm to 650 nm is 2.5% or less.

4. The anti-glare and anti-reflection film as claimed in claim 1, wherein the coloration of a light regularly reflected to a light incident at an angle of 5 degrees from a CIE standard light source $D_{65}$ in the wavelength region of 380 nm to 780 nm is a coloration in which L*, a*, and b* values of the CIE 1976 L*a*b* color space each satisfy the following formulas:

$$L^* \leq 10,\ 0 \leq a^* \leq 2,\ -5 \leq b^* \leq 2.$$

5. The anti-glare and anti-reflection film as claimed in claim 1, wherein the overall haze of said anti-glare and anti-reflection film is from 3.0% to 20.0%.

6. The anti-glare and anti-reflection film as claimed in claim 1, wherein a coefficient of kinetic friction of the low refractive index layer composed of said cured product of the fluorine-containing resin is in the range of 0.03 to 0.15, and a contact angle with a water is in the range of 90° to 120°.

7. The anti-glare and anti-reflection film as claimed in claim 1, wherein said low refractive index layer has a refractive index of 1.38 to 1.49.

8. The anti-glare and anti-reflection film as claimed in claim 1, wherein said anti-glare layer is composed of a polymer cross-linked by ionization radiation.

9. The anti-glare and anti-reflection film as claimed in claim 1, wherein a refractive index of said anti-glare layer is in the range of 1.57 to 2.00.

10. A polarizing plate comprising a polarizing layer and two protective films therefor, at least one of said protective films being the anti-glare and anti-reflection film as claimed in claim 1.

11. An image display device comprising a display component, wherein an anti-reflection layer of the polarizing plate as claimed in claim 10 is disposed as the outermost surface layer at the display side.

12. The image display device as claimed in claim 11, which is a liquid crystal display device.

13. The anti-glare and anti-reflection film as claimed in claim 2, wherein an average integral reflectance at an incidence of 5 degrees in the wavelength region of 450 nm to 650 nm is 2.5% or less.

14. The anti-glare and anti-reflection film as claimed in claim 2, wherein the coloration of a light regularly reflected to a light incident at an angle of 5 degrees from a CIE standard light source $D_{65}$ in the wavelength region of 380 nm to 780 nm is a coloration in which L*, a*, and b* values of the CIE 1976 L*a*b* color space each satisfy the following formulas:

$$L^* \leq 10,\ 0 \leq a^* \leq 2,\ -5 \leq b^* \leq 2.$$

15. The anti-glare and anti-reflection film as claimed in claim 2, wherein the overall haze of said anti-glare and anti-reflection film is from 3.0% to 20.0%.

16. The anti-glare and anti-reflection film as claimed in claim 2, wherein a coefficient of kinetic friction of the low refractive index layer composed of said cured product of the fluorine-containing resin is in the range of 0.03 to 0.15, and a contact angle with a water is in the range of 90° to 120°.

17. The anti-glare and anti-reflection film as claimed in claim 2, wherein said low refractive index layer has a refractive index of 1.38 to 1.49.

18. The anti-glare and anti-reflection film as claimed in claim 2, wherein said anti-glare layer is composed of a polymer cross-linked by ionization radiation.

19. The anti-glare and anti-reflection film as claimed in claim 2, wherein said anti-glare layer contains particles having an average particle size of from 0.3 μm to 10.0 μm.

20. The anti-glare and anti-reflection film as claimed in claim 2, wherein said particles contained in the anti-glare layer are spherical organic macromolecular particles.

21. The anti-glare and anti-reflection film as claimed in claim 2, wherein a refractive index of said anti-glare layer is in the range of 1.57 to 2.00.

22. The anti-glare and anti-reflection film as claimed in claim 2, wherein said anti-glare layer is formed from a monomer having at least two ethylenically unsaturated groups, and an oxide of at least one metal selected from the group consisting of titanium, aluminum, indium, zinc, tin, antimony and zirconium having a particle size of 0.1 μm or less.

23. The anti-glare and anti-reflection film as claimed in claim 2, wherein the low refractive index layer contains inorganic fine particles having an average particle size from 0.001 μm to 0.1 μm.

24. The anti-glare and anti-reflection film as claimed in claim 2, wherein the low refractive index layer contains silicon oxide particles as inorganic fine particles.

25. The anti-glare and anti-reflection film as claimed in claim 2, wherein said anti-glare and anti-reflection film has the value of clearness of the transmitted image ranging from 30% to 70%, said value being measured by means of an instrument for measuring image clarity, using an optical wedge of 0.5 mm in width.

26. A polarizing plate comprising a polarizing layer and two protective films therefor, at least one of said protective films being the anti-glare and anti-reflection film as claimed in claim 2.

27. An image display device comprising a display component, wherein an anti-reflection layer of the polarizing plate as claimed in claim 26 is disposed as the outermost surface layer at the display side.

28. The image display device as claimed in claim 27, which is a liquid crystal display device.

* * * * *